United States Patent [19]
Asai et al.

[11] 3,914,195
[45] Oct. 21, 1975

[54] PREPARATION OF SOLID POLYAMIDES USEFUL AS INK BINDERS

[75] Inventors: Schumkichiro Asai; Yasuyuki Kawakatsu; Wataru Yano; Hisao Kayamoto; Makoto Tashima; Itsuo Minakata, all of Wakayama, Japan

[73] Assignee: Kao Soap Co., Ltd., Tokyo, Japan

[22] Filed: Dec. 17, 1973

[21] Appl. No.: 425,626

[30] Foreign Application Priority Data
Dec. 19, 1972 Japan............................... 47-127472

[52] U.S. Cl................. 260/18 N; 106/26; 106/27; 260/23 R; 260/78 R; 260/78 UA; 260/404.5
[51] Int. Cl.².......................................... C08G 69/02
[58] Field of Search........... 260/18 N, 78 R, 78 UA, 260/486 R, 23 R, 404.5; 106/26, 27

[56] References Cited
UNITED STATES PATENTS

| | | | |
|---|---|---|---|
| 2,174,619 | 10/1939 | Carothers | 260/78 |
| 3,497,479 | 2/1970 | Cassar | 260/78 |
| 3,622,604 | 11/1971 | Drawert et al. | 260/18 |
| 3,637,551 | 1/1972 | Sprauer | 260/18 |
| 3,647,765 | 3/1972 | Mortillaro et al. | 260/78 |
| 3,700,618 | 10/1972 | Sharkey et al. | 260/18 |
| 3,783,136 | 1/1974 | Inukai et al. | 260/486 |
| 3,803,102 | 4/1974 | Whiton | 260/18 |

FOREIGN PATENTS OR APPLICATIONS
876,450    8/1961    United Kingdom

*Primary Examiner*—Eugene C. Rzucidlo
*Attorney, Agent, or Firm*—Woodhams, Blanchard and Flynn

[57] ABSTRACT

New polyamides are prepared by reacting (A) a dibasic acid ester of the formula
$$R_2OOC-CH_2-CH_2-R_1-CH_2-CH_2-COOR_2$$
wherein $R_1$ represents a bivalent vinylidene-type radical having one double bond and $R_2$ represents a radical which forms with acrylic acid an ester, or the dibasic acid ($R_2$ is H) obtained by hydrolysis of the above ester, or the saturated dibasic acid obtained by hydrogenation of the above acid or an ester of the above saturated dibasic acid, said dibasic acid ester being obtained from an acrylic acid ester and a vinylidene type olefin of the formula

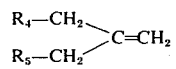

(where $R_4$ and $R_5$ represent H or an alkyl group having 1 to 19 carbon atoms) with (B) a diamine of the formula
$$H_2N-R_3-NH_2$$
wherein $R_3$ represents an aliphatic, aromatic or alicyclic hydrocarbon having 1 to 10 carbon atoms.

7 Claims, No Drawings

PREPARATION OF SOLID POLYAMIDES USEFUL AS INK BINDERS

BACKGROUND OF THE INVENTION

1. Field of the Invention

This invention relates to a process for the preparation of new polyamides using as the starting material a dibasic acid ester which is obtained by reacting an acrylic acid ester with a vinylidene type olefin in the presence of an acidic catalyst, or using as the starting material the dibasic acid obtained by hydrolysis of the above dibasic acid ester. The new polyamides are useful as binder resins for printing inks.

2. Description of the Prior Art

As binder resins for printing inks, there has been heretofore provided a polyamide which is prepared from a polymerized fatty acid (a polymerized fatty acid comprising as a principal ingredient an unsaturated fatty acid of natural origin such as oleic acid and linolic acid or the dimer of an ester thereof) and a polyamine. The above polyamide has, however, poor solubility in alcohol series solvents and poor fastness to weather. Thus, when the above polyamide is stored for a long period of time, exposed to contact with air, sun light irradiation or a high temperature environment, it is apt to deteriorate so that it exhibits various undesireable characteristics, such as a putrid smell and development of unwanted thickening (gelation).

This invention provides new polyamides which are free from the above disadvantages.

SUMMARY OF THE INVENTION

According to this invention new polyamides are prepared by reacting (A) a dibasic acid ester of the formula
$$R_2OOC-CH_2-CH_2-R_1-CH_2-CH_2-COOR_2$$
wherein $R_1$ is a bivalent vinylidene radical having one double bond and $R_2$ is a radical which forms an ester with acrylic acid, prepared from acrylic acid ester and a vinylidene type olefin

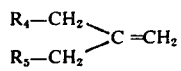

(wherein $R_4$ and $R_5$ each represent H or an alkyl group having 1 to 19 carbon atoms), or the dibasic acid (wherein $R_2$ is H) which is obtained by hydrolysis of the above dibasic acid ester, or a saturated dibasic acid which is obtained by hydrogenation of the above acid or an ester of the above saturated dibasic acid, with (B) a diamine of the formula
$$H_2N-R_3-NH_2$$
wherein $R_3$ is an aliphatic, aromatic or alicyclid divalent hydrocarbon radical having 1 to 10 carbon atoms.

The polyamide of the invention has the formula

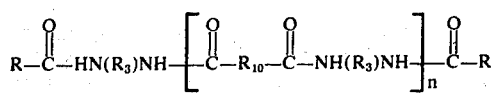

wherein
$n$ is from 3 to 50, R represents a hydrocarbon radical of 1 to 23 carbon atoms,
$R_{10}$ is a bivalent hydrocarbon radical of the formula

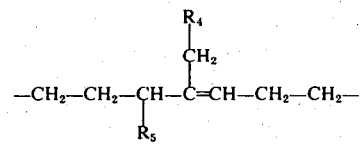

or

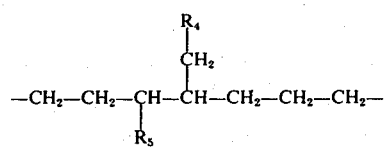

(in these formulas, the double bond may be moved to a position other than those illustrated therein) wherein
$R_4$ and $R_5$ each is H or alkyl having 1 to 19 carbon atoms, and
$R_3$ is $-(CH_2)_m-$ wherein $m$ is an integer from 1 to 10 alkylene having 2 to 10 carbon atoms, cycloalkylene having 3 to 10 carbon atoms, phenylene or alkyl-substituted phenylene having 7 to 10 carbon atoms.

It is preferred that one of $R_4$ and $R_5$ is H and the other is

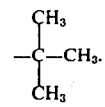

Another preference is that $R_3$ is ethylene, trimethylene, hexamethylene or xylylene.

The starting dibasic acid ester has the formula
$$R_2OOC-CH_2-CH_2-R_1-CH_2-CH_2-COOR_2$$
wherein $R_1$ is a vinylidene type olefin radical

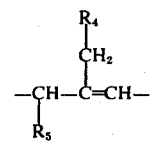

having one double bond and $R_2$ is H or a radical which forms an ester with acrylic acid.

The ester moiety $R_2$ is not critical and it can be derived from compounds which are reactive with acrylic acid to form acrylic acid esters. It is preferred, however, that $R_2$ is selected from the group consisting of alkyl having 1 to 8 carbon atoms such as methyl, ethyl, propyl and butyl, alkenyl having 2 to 8 carbon atoms, such as allyl, cycloalkyl having 3 to 8 carbon atoms, such as cyclohexyl, cycloalkenyl having 3 to 8 carbon atoms, and aryl and aralkyl having up to 8 carbon atoms such as benzyl. It is especially preferred that $R_2$ is methyl.

The dibasic acid ester employed in this invention can be prepared, for example, by reacting 2 mols of acrylic acid ester with 1 mol of a vinylidene type olefin, such as diisobutylene, in the presence of an acidic catalyst such as aluminium chloride, while the reaction mixture is heated at the reflux temperature. The preparation of such starting dibasic acid ester is disclosed in the pending U.S. patent application Ser. No. 298,389 of Ueda et al, now abandoned.

The product thus obtained can be hydrolyzed in a conventional manner to give the dibasic acid and/or the double bond contained in the group $R_1$ as defined above can be hydrogenated in a conventional manner to give a saturated dibasic acid ester or acid.

The polyamides according to this invention can be prepared by subjecting (A) the above dibasic acids or esters thereof and (B) diamines to dehydrocondensation which is carried out in a conventional manner.

There can be used in this invention aliphatic, aromatic or alicyclic diamines of the formula

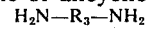

wherein $R_3$ represents a hydrocarbon having 1 to 10 carbon atoms. Conventional polyamide-forming diamines which have heretofore been used are suitable and, for example, ethylenediamine, propylenediamine, tetramethylenediamine, hexamethylenediamine, decamethylenediamine, xylylenediamine, phenylenediamine and cyclohexanediamine are suitable.

In carrying out the present invention, a monofunctional reactant can be used for controlling the molecular weight of the polyamide in a manner similar to a known process. As such reactant it is effective to use a fatty acid having 2 to 24 carbon atoms of the formula of RCOOH wherein R is a hydrocarbon radical of 1 to 23 carbon atoms. The fatty acid can be a saturated, unsaturated straight chain or branched chain fatty acid and, further, a mixture of such acids can be used.

In the preparation of polyamides according to this invention, a known acidic catalyst such as phosphoric acid can be used. Alternatively, the preparation can be achieved without using any catalyst. The dehydration condensation reaction for the preparation of the polyamides usually requires from 1 to 20 hours at a temperature of 130°–270°C, preferably 5 to 10 hours at 170°–230°C.

The amounts of each of the starting materials should preferably be determined so that the acid equivalent of the dibasic acid or ester thereof and the amine equivalent of the diamine are approximately the same.

For example, 0.3 to 0.48 (preferably 0.38 to 0.45) equivalent of a dibasic acid and 0.2 to 0.02 (preferably 0.12 to 0.05) equivalent of said monofunctional reactant, per 0.5 equivalent of diamine, are preferably used. These ratios correspond to the following mole ratios:

| | |
|---|---|
| diamine | 0.25 mole |
| dibasic acid | 0.15 to 0.24 mole |
| | (preferably 0.19 to 0.225 mole) |
| monofunctional reactant | 0.2 to 0.02 mole |
| | (preferably 0.12 to 0.05 mole) |

The polyamidation reaction is desirably performed in an inert gas stream such as nitrogen in order to prevent coloring of the polymer. Alternatively, said reaction can be carried out under vacuum with a view to accelerating the reaction.

In the present invention, it is possible to carry out the polyamidation reaction by replacing a part of the above-named dibasic acid or ester thereof with a known polymerized fatty acid such as dimeric acids having 32 to 44 carbon atoms or known dibasic acid HOOC $(CH_2)_p$COOH wherein $p$ is from 4 to 8 such as adipic acid or sebacic acid and such is included within the scope of this invention. When a known dibasic acid is used, the amount thereof is preferably less than 50% (by acid equivalent) of the total dibasic acid employed in the reaction.

This invention will be further described by reference to the following Examples which are given only for the purpose of illustrating, but not for limiting, the scope of this invention:

EXAMPLES 1 to 5

Into a glass lined vessel equipped with a stirrer, a temperature controller and a reflux condenser, there were charged 73 kg of methyl acrylate, 43 kg of diisobutylene and, as catalyst, 7.3 kg of aluminum chloride. The above mixture was reacted at the reflux temperature for 15 hours and thereafter the mixture was neutralized by the addition of 7.1 kg of 40% aqueous caustic soda solution. Unreacted methyl acrylate and water were removed by distillation under reduced pressure. 33.2 Kg of 25% aqueous sulfuric acid solution were added to transform the aluminum chloride to aluminum sulfate and washing with water was continued until the washings became neutral. One hundred kilograms of crude dibasic acid methyl ester were thus obtained. Further, 18.5 kg of monobasic acid methyl ester which was formed as a by-product during the reaction for forming the crude dibasic acid methyl ester was distilled off under reduced pressure to give 81.5 kg of purified dibasic acid methyl ester (having an acid value of 21.3, a saponification value of 387.3 and an iodine number of 79.6). This dibasic acid methyl ester is a mixture of the compound of the formula of

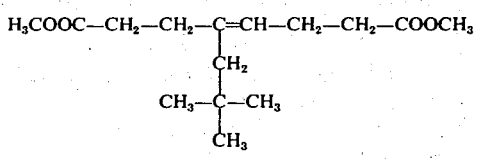

and the compound of the formula of

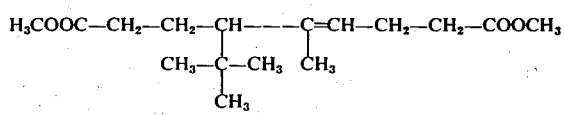

in a ratio of about 1:1.

Hydrolysis of this product in a conventional manner gave the corresponding acid (having an acid value of 417.6, a saponification value of 418.5 and an iodine number of 85.1).

The above dibasic acid methyl ester and the other various starting materials (as defined in Table 1 given hereinafter) were charged into a reactor equipped with a stirrer, cooling dehydration tube, nitrogen blowing tube and temperature controller and were reacted for 3 hours by elevating the temperature to 200°C while dehydrating slowly and for a further period of 4 hours at the same temperature but under a reduced pressure of 100 mmHg to form the desired polyamides.

The following Table 1 shows the reactants for the various syntheses and the properties of the resulting polyamides.

Table 1

| Example No. | Dibasic Acid Methyl Ester | Monofunctional Reactant | | Diamine | | Acid Value | Properties of Polyamide | | |
|---|---|---|---|---|---|---|---|---|---|
| | | | | | | | Total Amine Value | Softening Point* (°C) | Viscosity of Solution* (centipoise) |
| 1 | 1000g | Oleic acid*** | 114g | Ethylenediamine | 236g | 5.6 | 4.2 | 109 | 115 |
| 2 | 1000 | Oleic acid | 114 | 1,3-Diaminopropane | 292 | 4.8 | 2.4 | 108 | 123 |
| 3 | 1000 | Oleic acid | 114 | Hexamethylenediamine | 457 | 5.1 | 3.7 | 110 | 138 |
| 4 | 1000 | Oleic acid | 114 | Xylylenediamine | 535 | 5.1 | 2.5 | 110 | 125 |
| 5 | 1000 | **** Monobasic Acid Methyl Ester-by product | 60 | Ethylenediamine | 236 | 4.6 | 3.5 | 109 | 112 |

\* By ring and ball method as defined in ASTM E28-58T.
\*\* Viscosity of 35% resin solution dissolved in toluene/isopropanol=2/1, at 25°C.
\*\*\* Industrial oleic acid having an acid value of 200, a saponification value of 201.0 and an iodine number of 87.2 was used.
\*\*\*\*Monobasic acid methyl ester having an acid value of 293.8, a saponification value of 294.0 and an iodine number of 136.5 which was formed as a by-product from the dibasic acid starting material used in this invention, as described above.

EXAMPLES 6 to 10

The dibasic acid methyl ester obtained in Examples 1 to 5 was hydrogenated in an autoclave employing a palladium-carbon catalyst and was then hydrolyzed in a conventional manner to give saturated dibasic acid (having an acid value of 413.8, a saponification value of 415.0 and an iodine number of 0.6).

The above products were used as starting materials to effect polyamidation. The following Table 2 shows the reactants for the various syntheses and the properties of the resulting polyamides.

105 g of oleic acid and 170 g of ethylenediamine. The obtained polyamide resin had an acid value of 4.5, a total amine value of 1.0, a softening point of 109°C and a viscosity of 135 centipoise.

EXAMPLE 11

From the viewpoints of selection of a printing roller, selection of printing film and toxicity, a resin that shows good solubility in an alcohol series solvent is desired. A 35% resin solution of each of the polyamide resins obtained in each of Examples 1 to 10 and the Comparison Example, dissolved in a solvent of isopropanol/toluene = 5/1, was prepared and the condition thereof after storage for 24 hours at various temperatures was investigated. The following Table 3 shows the results.

Table 2

| Example No. | Saturated Dibasic Acid | Monofunctional Reactant | | Diamines | | Acid Value | Properties of Polyamide Product | | |
|---|---|---|---|---|---|---|---|---|---|
| | | | | | | | Total Amine Value | Softening Point (°C) | Viscosity of Solution (centipoise) |
| 6 | 1000g | Oleic acid | 114g | 1,3-Diaminopropane | 289g | 5.2 | 2.5 | 109 | 100 |
| 7 | 1000 | Oleic acid | 114 | Hexamethylenediamine | 453 | 4.6 | 3.4 | 110 | 123 |
| 8 | 1000 | Oleic acid | 114 | Xylylenediamine | 531 | 4.1 | 3.0 | 110 | 145 |
| 9 | 1000 | Monobasic acid methyl ester-by product | 60 | Ethylenediamine | 234 | 5.3 | 2.8 | 110 | 125 |
| 10 | 1000g (plus 536g of polymerized fatty acid)* | Oleic acid | 157 | Ethylenediamine | 259 | 4.7 | 2.7 | 108 | 136 |

*Empole 1022 from Emery Industries, Inc. (acid value of 194.8, saponification value of 196.0 and iodine number of 99.1).

COMPARISON EXAMPLE

In an analogous manner to Examples 1 to 5, polyamidation was effected using 1400 g of the polymerized fatty acid (Empole 1022) employed in Example 10,

Table 3

| Example | 10°C | 5°C | 0°C |
|---|---|---|---|
| 1 | Transparent and no change occurred | Transparent and no change occurred | Transparent and no change occurred |
| 2 | Transparent and no change occurred | Transparent and no change occurred | Transparent and no change occurred |
| 3 | Transparent and no change occurred | Transparent and no change occurred | Transparent and no change occurred |
| 4 | Transparent and no change occurred | Transparent and no change occurred | Transparent and no change occurred |
| 5 | Transparent and no change occurred | Transparent and no change occurred | Transparent and no change occurred |
| 6 | Transparent and no change occurred | Transparent and no change occurred | Transparent and no change occurred |

Table 3—Continued

| Example | 10°C | 5°C | 0°C |
| --- | --- | --- | --- |
| 7 | Transparent and no change occurred | Transparent and no change occurred | Transparent and no change occurred |
| 8 | Transparent and no change occurred | Transparent and no change occurred | Transparent and no change occurred |
| 9 | Transparent and no change occurred | Transparent and no change occurred | Transparent and no change occurred |
| 10 | Transparent and no change occurred | Transparent and no change occurred | Transparent and semigelation occurred |
| Comparison Example | Solution became opaque and semi-gelation occurred | Opaque and completely gelated | Opaque and completely gelated |

EXAMPLE 12

| | | |
| --- | --- | --- |
| Polyamide resin (Resins of Examples 1 to 10 and Comparison Example, respectively) | 50.6 | parts |
| Toluene/isopropanol = 2/1 | 84.4 | parts |
| Watchung Red Mn* | 15 | parts |

*Pigment, Lionol Red 2BL prepared by Toyo Ink Manufacturing Co., Ltd.

Each of the above compositions was placed in a 500 cc hexangular type ball mill and kneaded for 15 hours at room temperature. The mixture was printed on an aluminum foil with a wire coated to a film thickness of 10u. After drying overnight at room temperature, the printed surface was irradiated with sunshine carbon arc type weather-ometer to subject it to a weather resistance test. Thereafter two like printed surfaces were contacted in face-to-face relationship and were subjected to a blocking test under a load of 500 g/cm² at 60°C for 24 hours. The following Table 4 gives the results.

Table 4

| | |
| --- | --- |
| Example 1 | No blocking |
| Example 2 | No blocking |
| Example 3 | No blocking |
| Example 4 | No blocking |
| Example 5 | No blocking |
| Example 6 | No blocking |
| Example 7 | No blocking |
| Example 8 | No blocking |
| Example 9 | No blocking |
| Example 10 | No blocking |
| Referential Example | Completely blocked |

It will be understood that the polyamide resins, according to this invention, can be incorporated in printing ink compositions by dissolving same in suitable known solvents and dispersing therein a pigment. The polyamide resins are compatible with known printing ink pigments and any suitable pigment can be used therewith.

The embodiments of the invention in which an exclusive property or privilege is claimed are defined as follows:

1. A solid polyamide resin useful as a binder resin for printing ink, comprising the reaction product of a dibasic acid or ester reactant, a monobasic acid reactant and a diamine reactant, which are reacted at a molar ratio of from 0.15 to 0.24 mole of dibasic acid or ester reactant and 0.2 to 0.02 mole of monobasic acid reactant per 0.25 mole of diamine reactant so that the ratio of carboxyl equivalent to amine equivalent is substantially 1:1, at 130° to 270°C, for from 1 to 20 hours, said polyamide having from 3 to 50 recurring amide structural units, A. said dibasic acid or ester reactant consisting essentially of
   1. up to 50 mole percent of dimer acid having 32 to 44 carbon atoms or dibasic acid of the formula HOOC $(CH_2)_p$COOH wherein $p$ is an integer of from 4 to 8,
   2. the balance is a compound or mixture of compounds having the formula
   $R_2OOC—CH_2—CH_2—R_1—CH_2—CH_2—COOR_2$
   wherein $R_1$ has the formula

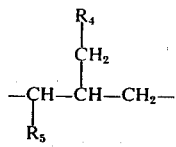

or

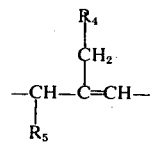

wherein one of $R_4$ and $R_5$ is hydrogen and the other thereof is —C(CH$_3$)$_3$, and $R_2$ is hydrogen or a radical which forms an ester with acrylic acid, and B. said monobasic acid reactant is a monobasic acid or mixture of monobasic acids capable for controlling the molecular weight of the polyamide product, and C. said diamine reactant has the formula
$H_2N—R_3—NH_2$
wherein $R_3$ is a divalent aliphatic, aromatic or alicyclic hydrocarbon radical having up to 10 carbon atoms.

2. A polyamide according to claim 1 in which $R_3$ is —(CH$_2$)$_m$ wherein $m$ is an integer from 1 to 10, alkylene having 2 to 10 carbon atoms, cycloalkylene having 3 to 10 carbon atoms, phenylene or alkyl-substituted phenylene having 7 to 10 carbon atoms.

3. A polyamide according to claim 1 in which said monobasic acid reactant is a fatty acid having from 2 to 24 carbon atoms or mixtures thereof.

4. A polyamide as defined in claim 1, in which $R_3$ is ethylene, trimethylene, hexamethylene or xylylene.

5. A polyamide according to claim 1, in which $R_2$ is alkyl having 1 to 8 carbon atoms, alkenyl having 2 to 8 carbon atoms, cycloalkyl having 3 to 8 carbon atoms, cycloalkenyl having 3 to 8 carbon atoms, aryl having up to 8 carbon atoms and aralkyl having up to 8 carbon atoms.

6. A polyamide according to claim 1, in which $R_2$ is methyl.

7. A printing ink composition comprising a dispersion of pigment in a solution of polyamide as claimed in claim 1.

* * * * *